(12) United States Patent
Din et al.

(10) Patent No.: US 9,421,700 B2
(45) Date of Patent: Aug. 23, 2016

(54) THREE-DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Shih-Jer Din, New Taipei (TW); Shih-Nan Lu, New Taipei (TW); Wei-Hsin Liao, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 137 days.

(21) Appl. No.: 14/093,052

(22) Filed: Nov. 29, 2013

(65) Prior Publication Data

US 2015/0056319 A1 Feb. 26, 2015

Related U.S. Application Data

(60) Provisional application No. 61/869,079, filed on Aug. 23, 2013.

(30) Foreign Application Priority Data

Oct. 15, 2013 (TW) .............................. 102137158 A

(51) Int. Cl.
*B29C 35/02* (2006.01)
*B29C 67/00* (2006.01)
(Continued)

(52) U.S. Cl.
CPC ......... *B29C 35/0266* (2013.01); *B29C 67/0055* (2013.01); *B29C 2035/0211* (2013.01);
(Continued)

(58) Field of Classification Search
None
See application file for complete search history.

(56) References Cited

U.S. PATENT DOCUMENTS 7,448,730 B2* 11/2008 Hirayama ........................ 347/59
2004/0138336 A1 7/2004 Bredt et al.
(Continued)

FOREIGN PATENT DOCUMENTS

AU 2823900 9/2000
CN 101561674 10/2009
(Continued)

OTHER PUBLICATIONS

"Office Action of Japan Counterpart Application", issued on Oct. 21, 2014, p. 1-p. 2.
(Continued)

*Primary Examiner* — Jacob Thomas Minskey
(74) *Attorney, Agent, or Firm* — Jianq Chyun IP Office

(57) ABSTRACT

A three-dimensional (3D) apparatus including a processing unit, a base and a printing head is provided. The processing unit is configured to read and process digital 3D model information. The base is coupled to and controlled by the processing unit. The base includes a plurality of heating regions. The processing unit is configured to selectively heat at least one of the heating regions according to the digital 3D model information. The printing head is disposed above the base. The printing head is coupled to and controlled by the processing unit to dispense a thermal melting material layer-by-layer on the heated heating region to form a 3D object related to the digital 3D model information.

7 Claims, 4 Drawing Sheets

(51) Int. Cl.
 *B29K 101/12* (2006.01)
 *B29K 105/00* (2006.01)
 *B29K 55/02* (2006.01)
 *B29K 67/00* (2006.01)

(52) U.S. Cl.
 CPC ....... *B29K2055/02* (2013.01); *B29K 2067/046* (2013.01); *B29K 2101/12* (2013.01); *B29K 2105/0067* (2013.01)

(56) References Cited

U.S. PATENT DOCUMENTS

| | | | | |
|---|---|---|---|---|
| 2013/0073073 | A1* | 3/2013 | Pettis | B29C 67/0085 700/119 |
| 2013/0095302 | A1* | 4/2013 | Pettis et al. | 428/195.1 |

FOREIGN PATENT DOCUMENTS

| | | |
|---|---|---|
| CN | 102173211 | 9/2011 |
| CN | 102511975 | 6/2012 |
| CN | 103129140 | 6/2013 |
| JP | H09234799 | 9/1997 |
| JP | H115255 | 1/1999 |
| JP | 2002337242 | 11/2002 |
| JP | 2009220576 | 10/2009 |
| JP | 2011251529 | 12/2011 |
| WO | 2010050604 | 5/2010 |

OTHER PUBLICATIONS

"Office Action of China Counterpart Application", issued on Mar. 4, 2016, p. 1-p. 6.

* cited by examiner

THREE-DIMENSIONAL PRINTING APPARATUS

CROSS-REFERENCE TO RELATED APPLICATION

This application claims the priority benefits of U.S. provisional application Ser. No. 61/869,079, filed on Aug. 23, 2013 and Taiwan application serial no. 102137158, filed on Oct. 15, 2013. The entirety of each of the above-mentioned patent applications is hereby incorporated by reference herein and made a part of this specification.

BACKGROUND

1. Technical Field

The invention relates to a printing apparatus. Particularly, the invention relates to a three-dimensional printing apparatus.

2. Related Art

Along with progress of computer-aided manufacturing (CAM), three-dimensional (3D) printing technology is developed to rapidly convert original design concept into physical models. The 3D printing technology is actually a general designation of a series of rapid prototyping (RP) techniques, and a basic principle thereof is additive manufacturing, where a RP machine is used to form a sectional shape of a workpiece in an X-Y plane through scanning, and intermittently shift by a layer thickness along a Z-axis, so as to form a 3D object. The 3D printing technology is not limited to any geometric shape, and the more complex the workpiece is, the more excellence the RP technology is demonstrated. The 3D printing technology can greatly save manpower and processing time, and under a demand of shortest time, digital 3D model information designed by software of 3D computer-aided design (CAD) can be truly presented as a physical part, which is not only touchable, a user can also actually feel a geometric curve of the physical part, and can test assembling ability of the physical part, or even perform possible functional tests.

In a current 3D printing apparatus that produces 3D parts according to the aforementioned RP technique, a base used for carrying a thermal melting constructing material is required to be continually heated during the manufacturing process of the 3D part, so as to maintain a temperature of the base to be higher than a curing temperature of the thermal melting constructing material, to prevent the thermal melting constructing material from cooling down too quickly and cured. However, since the above method has to maintain a melting state of the thermal melting constructing material in the process of printing, the base of the 3D printing apparatus has to be continuously heated, which leads to a higher cost and uneasy machine maintenance.

SUMMARY

The invention is directed to a three-dimensional printing apparatus, in which a base thereof is capable of being separately heated in different regions, so as to reduce manufacturing cost and unnecessary energy waste.

The invention provides a three-dimensional (3D) printing apparatus including a processing unit, a base and a printing head. The processing unit is configured to read and process digital 3D model information. The base is coupled to and controlled by the processing unit. The base includes a plurality of heating regions. The processing unit is configured to selectively heat at least one of the heating regions according to the digital 3D model information. The printing head is disposed above the base. The printing head is coupled to and controlled by the processing unit to dispense a thermal melting material layer-by-layer on the heated heating region to form a 3D object related to the digital 3D model information.

According to the above descriptions, in the embodiment of the invention, the base of the 3D printing apparatus includes a plurality of heating regions, such that the 3D printing apparatus is capable of controlling the base to selectively heat at least one of the heating regions according to the digital 3D model information, and controlling the printing head to dispense the thermal melting material on the heated heating region to form a 3D object related to the digital 3D model information. In this way, the 3D printing apparatus is unnecessary to heat the whole base, but selectively heats at least one of the heating regions according to the digital 3D model information. Therefore, operation and maintenance cost of the 3D printing apparatus of the invention are reduced and unnecessary energy waste is also reduced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention. Moreover, in following embodiments, the same or similar reference numbers denote the same or similar components.

Figure 1:
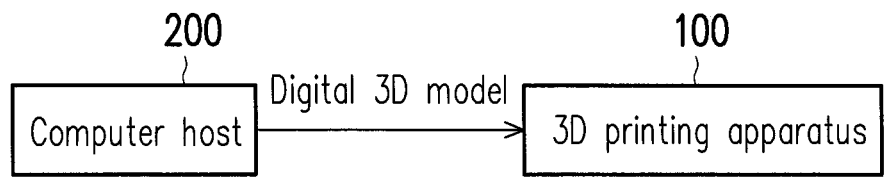
FIG. 1 is a schematic diagram of an operation environment of a three-dimensional (3D) printing apparatus according to an embodiment of the invention.
Figure 2:
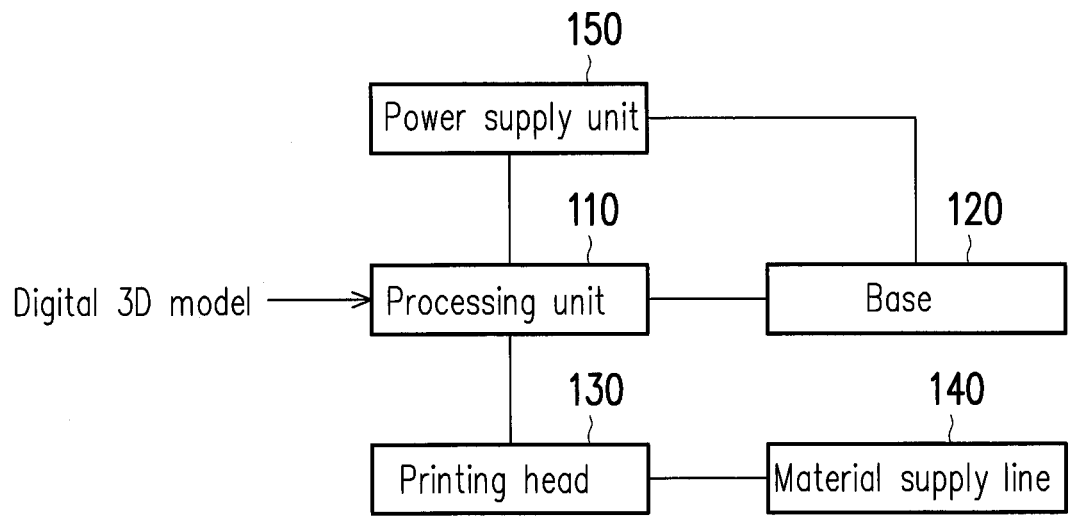
FIG. 2 is a partial block diagram of a 3D printing apparatus according to an embodiment of the invention.
Figure 3:
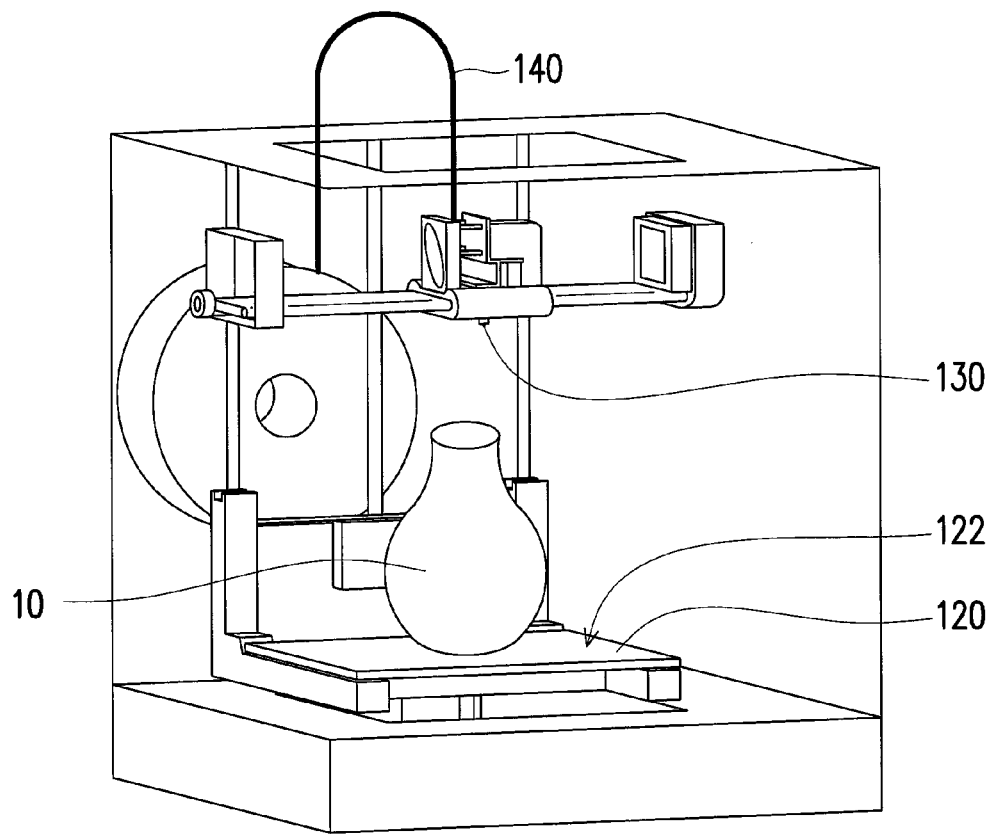
FIG. 3 is a three-dimensional view of a part of components of a 3D printing apparatus according to an embodiment of the invention.

FIG. 1 is a schematic diagram of an operation environment of a three-dimensional (3D) printing apparatus according to an embodiment of the invention. FIG. 2 is a partial block diagram of the 3D printing apparatus according to an embodiment of the invention. FIG. 3 is a three-dimensional view of a part of components of the 3D printing apparatus according to an embodiment of the invention. Referring to FIG. 1 to FIG. 3, in the present embodiment, the 3D printing apparatus 100 is adapted to print a 3D object 10 according to digital 3D model information, and the 3D printing apparatus 100 includes a processing unit 110, a base 120 and a printing head 130. In the present embodiment, the digital 3D model information can be a digital 3D image file, which may be, for example, constructed by a computer host 200 by using software of computer-aided design (CAD) or animation modelling software, etc. The processing unit 110 is configured to read and process the digital 3D model information.

The base 120 has a carrying surface 122, which is used for carrying a thermal melting material dispensed by the printing head 130. In the present embodiment, the 3D printing apparatus 100 further includes at least one material supply line 140, which is coupled to the printing head 130 for supplying the thermal melting material to the printing head 130. The printing head 130 is disposed above the base 120, and the processing unit 110 is coupled to the printing head 130 and controls the printing head 130 to dispense the thermal melting material onto the carrying surface 122 of the base 120 layer-by-layer to form the 3D object 10. In the present embodiment, the material supplying line 140 can be a solid-state line made of thermal melting material, and the solid-state line can be heated by a heating unit of the printing head to melt the thermal melting material, and the melted thermal melting material is extruded from the printing head 130, and is stacked on the carrying surface 122 layer-by-layer from bottom to top, so as to form a plurality of thermal melting material layers, and the thermal melting material layers are stacked to form the 3D object 10. In the present embodiment, the thermal melting material is, for example, a thermal-melting polymer material such as polylactic acid (PLA) or acrylonitrile butadiene styrene (ABS), etc. It should be noticed that the thermal melting material printed on the carrying surface 122 layer by layer by the printing head 130 generally includes a constructing material used for constructing the 3D object 10 and a supporting material used for supporting the 3D object 10. Namely, the thermal melting material printed on the carrying surface 122 is not only used for constructing the 3D object 10, but is also used for constructing a supporting part or a base used for supporting the 3D object 10, and after the thermal melting material formed on the carrying surface 122 is cured, the supporting material used for supporting the 3D object 10 can be removed to obtain the 3D object 10.

According to the above descriptions, during the process that the printing head 130 dispenses the thermal melting material layer-by-layer on the base 120, the 3D printing apparatus 100 can separately heat the base 120 according to, for example, the size of a bottom layer of the digital 3D model information. Namely, the base 120 includes a plurality of heating regions, and the 3D printing apparatus 100 can selectively heat at least one of the heating regions according to the digital 3D model information, so as to maintain a temperature of the heated heating region to be higher than a curing temperature of the thermal melting material, and prevent the thermal melting material from quickly cooling down and cured. Moreover, after printing task of the 3D printing apparatus 100 is completed, a curing and drying process can be performed to the 3D object 10 on the base 120. In this way, manufacturing of the 3D object 10 is preliminarily completed.

Figure 4:
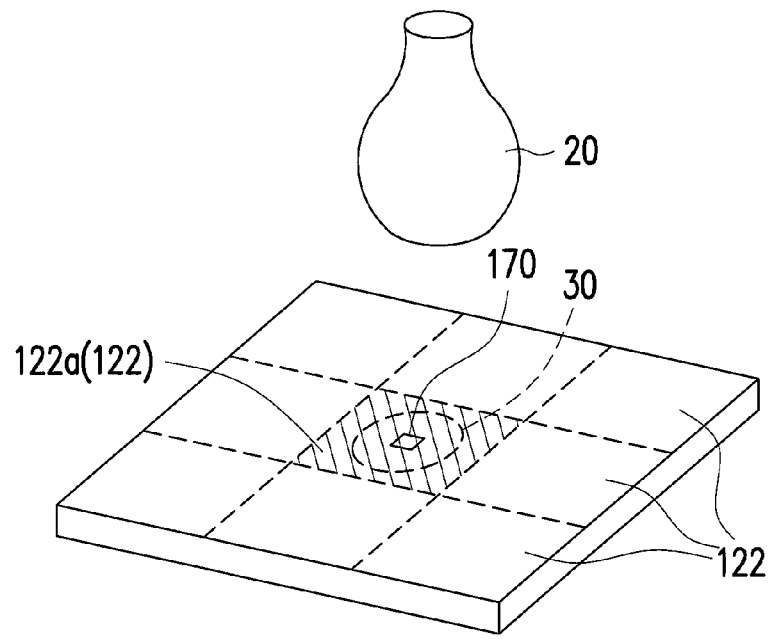
FIG. 4 is a schematic diagram of a base of a 3D printing apparatus according to an embodiment of the invention.

FIG. 4 is a schematic diagram of the base of the 3D printing apparatus according to an embodiment of the invention. Referring to FIG. 2 to FIG. 4, in detail, in the present embodiment, the processing unit 110 is coupled to and controls the printing head 130 and the base 120, where the base 120 includes a plurality of heating regions 122 as that shown in FIG. 4. After the processing unit 110 reads digital 3D model information 20, the processing unit 110 selectively heats at least one of the heating regions 122 according to the digital 3D model information 20. In detail, the digital 3D model information 20 may include bottom layer distribution data related to the heating region 122 to be heated of the base 120. Further, the digital 3D model information 20 includes a plurality of cross section data related to cross-sections of the 3D object 10, and the bottom layer distribution data is distribution data of a bottom cross section of the 3D object 10 directly contacting the base 120, which is corresponded to a plane coordinate of the base 120 to obtain the heating region 122a to be heated on the base 120. The processing unit 110 may correspond the digital 3D model information 20 to a plane coordinate 30 of the base 120, for example, converts the bottom layer distribution data of the digital 3D model information 20 into the plane coordinate of the base 120, so as to obtain a position and a distribution area of the 3D object 10 related to the digital 3D model information 20 and about to be formed on the base 120. Then, the plane coordinate 30 corresponds to at least one of the heating regions 122 (for example, the heating region 122a in FIG. 4), and the processing unit 110 controls the base 120 to heat the heating region (for example, the heating region 122a in FIG. 4) corresponding to the plane coordinate 30 according to the plane coordinate.

Moreover, in the present embodiment, the 3D printing apparatus 100 further includes a temperature sensing element 170 disposed in a central region of the base 120 for sensing a temperature of the base 120. For example, the temperature sensing element 170 is, for example, a thermistor. Further, the temperature sensing element 170 may be a negative temperature coefficient (NTC) thermistor, and a resistance value thereof is decreased as the temperature is increased. The processing unit 110 is coupled to the temperature sensing element 170, and deduces a temperature of the base 120 according to the resistance value of the temperature sensing element 170, and controls the temperature of the heated heating region 122a to be within a specific range. In the present embodiment, the temperature of the heated heating region 122a is maintained to about 120 degrees to 150 degrees.

According to the above descriptions, the processing unit 110 controls the printing head 130 to dispense the thermal melting material on the heated heating region 122a layer-by-layer to form the 3D object 10 related to the digital 3D model information 20. After the 3D object 10 is formed, the processing unit 110 controls the base 120 to stop heating the heating region 122a. In this way, the 3D printing apparatus 100 is unnecessary to heat the whole base 120, but controls the base 120 to selectively heat at least one of the heating regions 122 according to the digital 3D model information 20, i.e. only heat the selected heating region 122a corresponding to the bottom layer distribution data of the digital 3D model information 20, so as to maintain the temperature of the heating region 122a to be higher than the curing temperature of the thermal melting material formed thereon. In this way, operation and maintenance cost of the 3D printing apparatus 100 of the present embodiment are reduced and unnecessary energy waste is also reduced.

Figure 5:
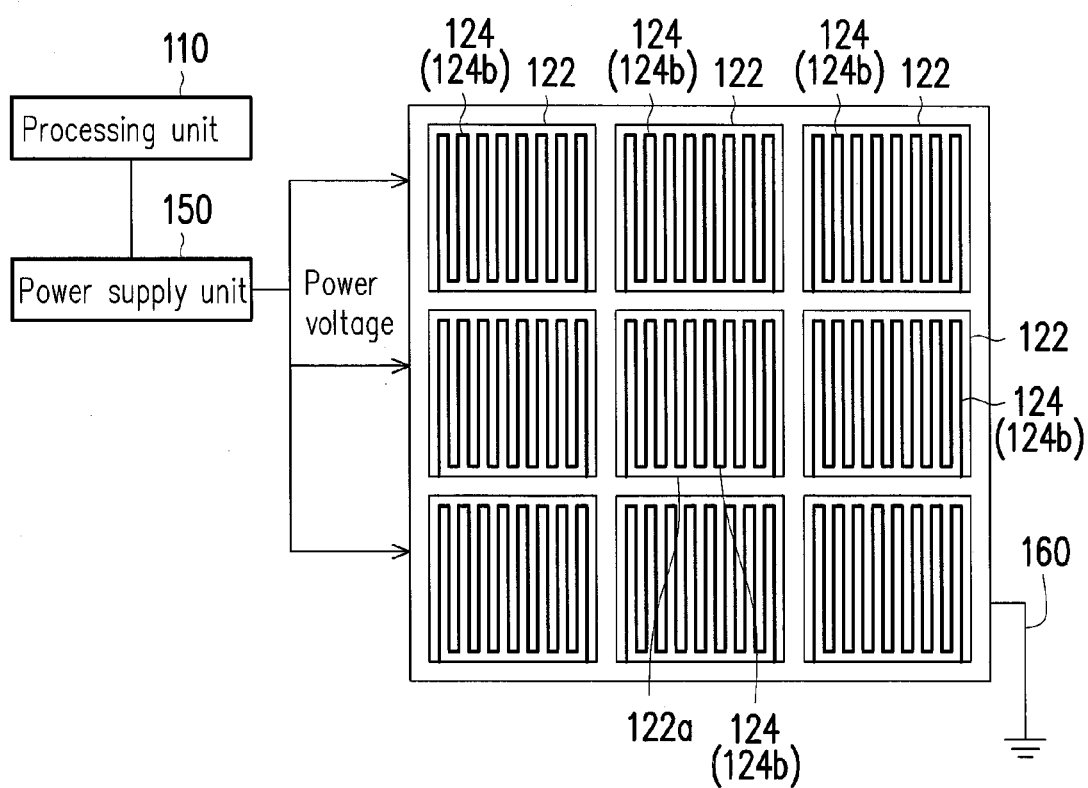
FIG. 5 is a schematic diagram of a part of components of a 3D printing apparatus according to an embodiment of the invention.

FIG. 5 is a schematic diagram of a part of components of the 3D printing apparatus according to an embodiment of the invention. Referring to FIG. 3 and FIG. 5, in the present embodiment, the base 120 may further includes a plurality of heating modules 124, and the heating modules 124 are respectively coupled to the processing unit 110 and are disposed corresponding to the heating regions 122. Each of the heating modules 124 may include a heating resistor 124b. The processing unit 110 controls at least one of the heating modules 124 to heat the selected heating region 122a to be heated according to the digital 3D model information 20. In detail, the 3D printing apparatus 100 may further include a power supply unit 150 and a ground line 160. The power supply unit 150 is coupled to and controlled by the processing unit 110 for providing a power supply voltage, and the ground line 160 is used for providing a ground voltage. Each of the heating modules 124 is coupled between the power supply unit 150 and the ground line 160.

According to the above descriptions, the processing unit 110 controls the power supply unit 150 to provide the power supply voltage to at least one of the heating modules 124 according to the digital 3D model information 20. Namely, the processing unit 110 determines the heating region 122a to be heated (for example, the heating region 122a in the middle as that shown in FIG. 5) of the heating regions 122 according to the bottom layer distribution data of the digital 3D model information 20, and controls the power supply unit 150 to provide the power supply voltage to the corresponding heating module 124, so as to heat the heating region 122a to be heated. Certainly, the figure of the embodiment is only an example, and the number of the heating regions 122a to be heated is not limited by the invention, and in other embodiments of the invention, if the bottom layer distribution data simultaneously corresponds to a plurality of heating regions 122a in the base 120, the processing unit 110 can control to simultaneously heat the plurality of heating regions 122a according to the bottom layer distribution data.

In this way, the processing until 110 controls the printing head 130 to dispense the thermal melting material on the heated heating region 122a layer-by-layer, so as to form the 3D object 10 related to the digital 3D model information 20. After the 3D object 10 is formed, the processing unit 110 controls the power supply unit 150 to stop providing the power supply voltage to the heating module 124, and performs a cooling or curing process to the 3D object 10 to complete manufacturing the 3D object 10.

It should be noticed that reference numbers of the components and a part of contents of the aforementioned embodiment are also used in the following embodiment, wherein the same reference numbers denote the same or like components, and descriptions of the same technical contents are omitted. The aforementioned embodiment can be referred for descriptions of the omitted parts, and detailed descriptions thereof are not repeated in the following embodiment.

Figure 6:
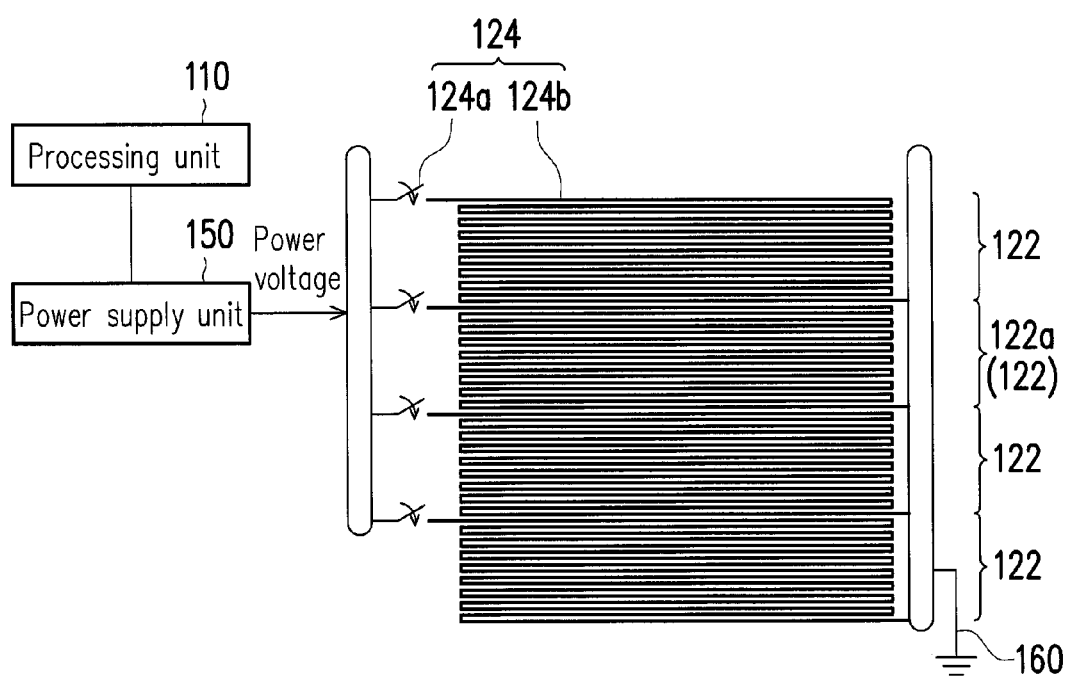
FIG. 6 is a schematic diagram of a part of components of a 3D printing apparatus according to another embodiment of the invention.

FIG. 6 is a schematic diagram of a part of components of a 3D printing apparatus according to another embodiment of the invention. Referring to FIG. 3 and FIG. 6, the 3D printing apparatus of the present embodiment is similar to the 3D printing apparatus of FIG. 5, the base 120 of the present embodiment may also include a plurality of heating modules 124, and the heating modules 124 are respectively coupled to the processing unit 110 and are disposed corresponding to the heating regions 122. The 3D printing apparatus 100 may also includes the power supply unit 150 and the ground line 160. The power supply unit 150 is coupled to and controlled by the processing unit 110 for providing a power supply voltage and the ground line 160 is used for providing a ground voltage. A main difference between the 3D printing apparatus of the present embodiment and the 3D printing apparatus of FIG. 5 is that each of the heating modules 124 includes a switch 124a and a heating resistor 124b, and each of the heating resistors 124b is coupled to the ground line 160 and is coupled to the power supply unit 150 through the corresponding switch 124a. In the present embodiment, the switches 124a are, for example, N-type transistors. Certainly, those with ordinary skills in the art should understand that besides the N-type transistors, the switches can be implemented by P-type transistors, multiplexers, transmission gates, relays, etc., which is not limited by the invention.

According to the above descriptions, the processing unit 110 turns on at least one of the switches 124a according to the digital 3D model information 20, which enables the power supply unit 150 to provide the power supply voltage to the heating resistor 124b corresponding to the turned-on switch 124a. Namely, the processing unit 110, for example, selects at least one of the heating regions 122 as the heating region 122a to be heated according to the bottom layer distribution information of the digital 3D model information 20, and turns on the switch 124a of the corresponding heating module 124, such that the power supply unit 150 can provide the power supply voltage to the corresponding heating resistor 124b to heat the heating region 122a to be heated. Certainly, the figure of the embodiment is only an example, and the number of the heating regions 122a to be heated is not limited by the invention, and in other embodiments of the invention, if the bottom layer distribution data simultaneously corresponds to a plurality of heating regions 122a in the base 120, the processing unit 110 can control to simultaneously heat the plurality of heating regions 122a according to the bottom layer distribution data.

In this way, the processing until 110 controls the printing head 130 to dispense the thermal melting material on the heated heating region 122a layer-by-layer, so as to form the 3D object 10 related to the digital 3D model information 20. After the 3D object 10 is formed, the processing unit 110 controls to turn off the switch 124a, so as to stop heating the heating region 122a, and performs a cooling or curing process to the 3D object 10 to complete manufacturing the 3D object 10.

In summary, the base of the 3D printing apparatus includes a plurality of heating regions, such that the 3D printing apparatus can selectively heat at least one of the heating regions according to the digital 3D model information constructed through, for example, a computer host, and control the printing head to dispense the thermal melting material on the heated heating region to form a 3D object related to the digital 3D model information. In this way, the 3D printing apparatus is unnecessary to heat the whole base, but selectively heats the heating region corresponding to a position on the base where the 3D object is set to be formed, so as to maintain the temperature of the heated heating region to be higher than the curing temperature of the thermal melting material dispensed thereon. Therefore, the operation and maintenance cost of the 3D printing apparatus of the invention are reduced and unnecessary energy waste is also reduced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A three-dimensional (3D) printing apparatus, comprising:
   a processing unit, configured to read and process digital 3D model information;
   a base, coupled to and controlled by the processing unit, wherein the base comprises a plurality of heating modules and a plurality of heating regions, the heating modules are coupled to the processing unit and disposed corresponding to the heating regions, and the processing unit is configured to control the heating modules to selectively heat at least one of the heating regions according to the digital 3D model information, wherein the digital 3D model information comprises bottom layer distribution data, and the bottom layer distribution data corresponds to a plane coordinate of the base, the processing unit controls the base to heat the at least one heating region to be heated according to the plane coordinate; and a printing head, disposed above the base, wherein the printing head is coupled to and controlled by the processing unit to dispense a thermal melting material layer-by-layer on the at least one heated heating region, so as to form a 3D object related to the digital 3D model information.

2. The 3D printing apparatus as claimed in claim 1, wherein after the processing unit controls the printing head to dispense the thermal melting material layer by layer on the at least one heated heating region to form the 3D object, the processing unit controls the base to stop heating the at least one heated heating region.

3. The 3D printing apparatus as claimed in claim 1, further comprising a power supply unit and a ground line, wherein the power supply unit is coupled to and controlled by the processing unit for providing a power supply voltage, and the ground line is configured to provide a ground voltage, each of the heating modules is coupled between the power supply unit and the ground line, and the processing unit controls the power supply unit to provide the power supply voltage to at least one of the heating modules corresponding to the at least one selected heating region according to the digital 3D model information.

4. The 3D printing apparatus as claimed in claim 3, wherein after the processing unit controls the printing head to dispense the thermal melting material layer by layer on the at least one heated heating region to form the 3D object, the processing unit controls the power supply unit to stop supplying the power supply voltage to the heating modules.

5. The 3D printing apparatus as claimed in claim 1, further comprising a power supply unit and a ground line, wherein the power supply unit is coupled to and controlled by the processing unit for providing a power supply voltage, and the ground line is configured to provide a ground voltage, each of the heating modules comprises a switch and a heating resistor, each of the heating resistors is coupled to the ground line, and is coupled to the power supply unit through the corresponding switch, and the processing unit turns on at least one of the switches according to the digital 3D model information, so as to provide the power supply voltage to the corresponding heating resistor to heat the at least one selected heating region.

6. The 3D printing apparatus as claimed in claim 5, wherein after the processing unit controls the printing head to dispense the thermal melting material layer-by-layer on the heated heating region to form the 3D object, the processing unit turning off the switches.

7. The 3D printing apparatus as claimed in claim 1, further comprising a temperature sensing element disposed on the base and coupled to the processing unit for sensing a temperature of the base, wherein the processing unit obtains the temperature of the base through the temperature sensing element, and accordingly controls the temperature of the at least one heated heating region to be within a specific range.

* * * * *